(12) United States Patent
Ding

(10) Patent No.: US 11,818,171 B2
(45) Date of Patent: Nov. 14, 2023

(54) APPROACHES FOR SECURING MIDDLEWARE DATA ACCESS

(71) Applicant: Palantir Technologies Inc., Denver, CO (US)

(72) Inventor: James Ding, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 159 days.

(21) Appl. No.: 17/334,436

(22) Filed: May 28, 2021

(65) Prior Publication Data

US 2021/0288999 A1    Sep. 16, 2021

Related U.S. Application Data

(63) Continuation of application No. 16/171,075, filed on Oct. 25, 2018, now Pat. No. 11,025,672.

(51) Int. Cl.
H04L 9/40    (2022.01)

(52) U.S. Cl.
CPC ...... H04L 63/1491 (2013.01); H04L 63/0281 (2013.01); H04L 63/062 (2013.01); H04L 63/0807 (2013.01); H04L 63/0884 (2013.01); H04L 63/1466 (2013.01); H04L 63/10 (2013.01)

(58) Field of Classification Search
CPC . H04L 63/1491; H04L 63/10; H04L 63/0281; H04L 63/062; H04L 63/0884; H04L 63/1466; H04L 63/0807
See application file for complete search history.

(56) References Cited

U.S. PATENT DOCUMENTS

| 4,899,161 | A | 2/1990 | Morin, Jr. et al. |
| 4,958,305 | A | 9/1990 | Piazza |
| 5,329,108 | A | 7/1994 | Lamoure |

(Continued)

FOREIGN PATENT DOCUMENTS

| AU | 2012216622 A1 | 4/2013 |
| DE | 102013222023 A1 | 1/2015 |

(Continued)

OTHER PUBLICATIONS

NPL Search Terms (Year: 2022).*

(Continued)

*Primary Examiner* — Syed A Zaidi
(74) *Attorney, Agent, or Firm* — Sheppard Mullin Richter & Hampton LLP

(57) ABSTRACT

Systems and methods are provided for determining an access request provided by an entity that seeks to interact with one or more backend systems through a middleware system, the access request including a genuine access token. The entity can be authenticated based on the genuine access token. When a client request is made to the middleware system with a genuine access token, the request can be made through a smart ingress and egress proxy which intercepts the request and replaces the genuine access token with an invalid access token. The middleware system can subsequently make authorized requests to downstream systems on behalf of the middleware system's client by treating the smart proxy as an egress proxy for those subsequent requests, and the smart proxy replaces the invalid access token with a genuine one.

20 Claims, 5 Drawing Sheets

(56) References Cited

U.S. PATENT DOCUMENTS

| | | |
|---|---|---|
| 5,754,182 A | 5/1998 | Kobayashi |
| 5,781,195 A | 7/1998 | Marvin |
| 5,781,704 A | 7/1998 | Rossmo |
| 6,091,956 A | 7/2000 | Hollenberg |
| 6,157,747 A | 12/2000 | Szeliski et al. |
| 6,169,552 B1 | 1/2001 | Endo et al. |
| 6,173,067 B1 | 1/2001 | Payton et al. |
| 6,178,432 B1 | 1/2001 | Cook et al. |
| 6,247,019 B1 | 6/2001 | Davies |
| 6,389,289 B1 | 5/2002 | Voce et al. |
| 6,414,683 B1 | 7/2002 | Gueziec |
| 6,483,509 B1 | 11/2002 | Rabenhorst |
| 6,529,900 B1 | 3/2003 | Patterson et al. |
| 6,631,496 B1 | 10/2003 | Li et al. |
| 6,662,103 B1 | 12/2003 | Skolnick et al. |
| 6,757,445 B1 | 6/2004 | Knopp |
| 6,828,920 B2 | 12/2004 | Owen et al. |
| 6,983,203 B1 | 1/2006 | Wako |
| 6,985,950 B1 | 1/2006 | Hanson et al. |
| 7,036,085 B2 | 4/2006 | Barros |
| 7,062,563 B1 * | 6/2006 | Lewis ................ H04L 63/0815 709/227 |
| 7,158,878 B2 | 1/2007 | Rasmussen et al. |
| 7,375,732 B2 | 5/2008 | Aguera Y Arcas |
| 7,379,811 B2 | 5/2008 | Rasmussen et al. |
| 7,457,706 B2 | 11/2008 | Melero et al. |
| 7,502,786 B2 | 3/2009 | Liu et al. |
| 7,519,470 B2 | 4/2009 | Brasche et al. |
| 7,529,195 B2 | 5/2009 | Gorman |
| 7,539,666 B2 | 5/2009 | Ashworth et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,617,314 B1 | 11/2009 | Bansod et al. |
| 7,620,628 B2 | 11/2009 | Kapur et al. |
| 7,663,621 B1 | 2/2010 | Allen et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,920,963 B2 | 4/2011 | Jouline et al. |
| 7,945,852 B1 | 5/2011 | Pilskalns |
| 7,962,281 B2 | 6/2011 | Rasmussen et al. |
| 7,970,240 B1 | 6/2011 | Chao et al. |
| 8,010,545 B2 | 8/2011 | Stefik et al. |
| 8,036,632 B1 | 10/2011 | Cona et al. |
| 8,065,080 B2 | 11/2011 | Koch |
| 8,085,268 B2 | 12/2011 | Carrino et al. |
| 8,134,457 B2 | 3/2012 | Velipasalar et al. |
| 8,145,703 B2 | 3/2012 | Frishert et al. |
| 8,200,676 B2 | 6/2012 | Frank |
| 8,214,361 B1 | 7/2012 | Sandler et al. |
| 8,214,764 B2 | 7/2012 | Gemmell et al. |
| 8,229,947 B2 | 7/2012 | Fujinaga |
| 8,230,333 B2 | 7/2012 | Decherd et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,325,178 B1 | 12/2012 | Doyle, Jr. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,514,229 B2 | 8/2013 | Cervelli et al. |
| 8,515,207 B2 | 8/2013 | Chau |
| 8,564,596 B2 | 10/2013 | Carrino et al. |
| 8,742,934 B1 | 6/2014 | Sarpy, Sr. et al. |
| 8,781,169 B2 | 7/2014 | Jackson et al. |
| 8,799,799 B1 | 8/2014 | Cervelli et al. |
| 8,830,322 B2 | 9/2014 | Nerayoff et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,177 B2 | 4/2015 | Zheng et al. |
| 9,021,384 B1 | 4/2015 | Beard et al. |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,129,219 B1 | 9/2015 | Robertson et al. |
| 9,146,125 B2 | 9/2015 | Vulcano et al. |
| 9,280,618 B1 | 3/2016 | Bruce et al. |
| 2002/0003539 A1 | 1/2002 | Abe |
| 2002/0033848 A1 | 3/2002 | Sciammarella et al. |
| 2002/0116120 A1 | 8/2002 | Ruiz et al. |
| 2002/0130867 A1 | 9/2002 | Yang et al. |
| 2002/0130906 A1 | 9/2002 | Miyaki |
| 2003/0052896 A1 | 3/2003 | Higgins et al. |
| 2003/0103049 A1 | 6/2003 | Kindratenko et al. |
| 2003/0144868 A1 | 7/2003 | MacIntyre et al. |
| 2003/0163352 A1 | 8/2003 | Surpin et al. |
| 2003/0163569 A1 | 8/2003 | Panasyuk |
| 2003/0225755 A1 | 12/2003 | Iwayama et al. |
| 2004/0030492 A1 | 2/2004 | Fox et al. |
| 2004/0039498 A1 | 2/2004 | Ollis et al. |
| 2004/0098236 A1 | 5/2004 | Mayer et al. |
| 2005/0031197 A1 | 2/2005 | Knopp |
| 2005/0034062 A1 | 2/2005 | Bufkin et al. |
| 2005/0080769 A1 | 4/2005 | Gemmell et al. |
| 2005/0143602 A1 | 6/2005 | Yada et al. |
| 2005/0162523 A1 | 7/2005 | Darrell et al. |
| 2005/0182502 A1 | 8/2005 | Iyengar |
| 2005/0182793 A1 | 8/2005 | Keenan et al. |
| 2005/0198380 A1 * | 9/2005 | Panasyuk ............ H04L 63/0209 709/239 |
| 2005/0223044 A1 | 10/2005 | Ashworth et al. |
| 2005/0267652 A1 | 12/2005 | Allstadt et al. |
| 2006/0026170 A1 | 2/2006 | Kreitler et al. |
| 2006/0139375 A1 | 6/2006 | Rasmussen et al. |
| 2006/0146050 A1 | 7/2006 | Yamauchi |
| 2006/0149596 A1 | 7/2006 | Surpin et al. |
| 2006/0200384 A1 | 9/2006 | Arutunian et al. |
| 2006/0248205 A1 * | 11/2006 | Randle ................ H04L 63/0869 709/229 |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0057966 A1 | 3/2007 | Ohno et al. |
| 2007/0078832 A1 | 4/2007 | Ott et al. |
| 2007/0115373 A1 | 5/2007 | Gallagher et al. |
| 2007/0180225 A1 | 8/2007 | Schmidt |
| 2007/0188516 A1 | 8/2007 | Ioup et al. |
| 2007/0208497 A1 | 9/2007 | Downs et al. |
| 2007/0208498 A1 | 9/2007 | Barker et al. |
| 2007/0258642 A1 | 11/2007 | Thota |
| 2007/0294643 A1 | 12/2007 | Kyle |
| 2008/0010605 A1 | 1/2008 | Frank |
| 2008/0040684 A1 | 2/2008 | Crump |
| 2008/0077642 A1 | 3/2008 | Carbone et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0133579 A1 | 6/2008 | Lim |
| 2008/0163073 A1 | 7/2008 | Becker et al. |
| 2008/0192053 A1 | 8/2008 | Howell et al. |
| 2008/0195417 A1 | 8/2008 | Surpin et al. |
| 2008/0223834 A1 | 9/2008 | Griffiths et al. |
| 2008/0229056 A1 | 9/2008 | Agarwal et al. |
| 2008/0263468 A1 | 10/2008 | Cappione et al. |
| 2008/0267107 A1 | 10/2008 | Rosenberg |

(56) References Cited

U.S. PATENT DOCUMENTS

| | | |
|---|---|---|
| 2008/0270468 A1 | 10/2008 | Mao et al. |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301643 A1 | 12/2008 | Appleton et al. |
| 2009/0027418 A1 | 1/2009 | Maru et al. |
| 2009/0088964 A1 | 4/2009 | Schaaf et al. |
| 2009/0100018 A1 | 4/2009 | Roberts |
| 2009/0115786 A1 | 5/2009 | Shimasaki et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0158185 A1 | 6/2009 | Lacevic et al. |
| 2009/0171939 A1 | 7/2009 | Athsani et al. |
| 2009/0172511 A1 | 7/2009 | Decherd et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0222400 A1 | 9/2009 | Kupershmidt et al. |
| 2009/0292626 A1 | 11/2009 | Oxford |
| 2010/0057716 A1 | 3/2010 | Stefik et al. |
| 2010/0063961 A1 | 3/2010 | Guiheneuf et al. |
| 2010/0070523 A1 | 3/2010 | Delgo et al. |
| 2010/0076968 A1 | 3/2010 | Boyns et al. |
| 2010/0106420 A1 | 4/2010 | Mattikalli et al. |
| 2010/0162176 A1 | 6/2010 | Dunton |
| 2010/0185692 A1 | 7/2010 | Zhang et al. |
| 2010/0198684 A1 | 8/2010 | Eraker et al. |
| 2010/0199225 A1 | 8/2010 | Coleman et al. |
| 2010/0277611 A1 | 11/2010 | Holt et al. |
| 2010/0293174 A1 | 11/2010 | Bennett et al. |
| 2010/0321399 A1 | 12/2010 | Ellren et al. |
| 2011/0022312 A1 | 1/2011 | McDonough et al. |
| 2011/0090254 A1 | 4/2011 | Carrino et al. |
| 2011/0117878 A1 | 5/2011 | Barash et al. |
| 2011/0137766 A1 | 6/2011 | Rasmussen et al. |
| 2011/0153368 A1 | 6/2011 | Pierre et al. |
| 2011/0161096 A1 | 6/2011 | Buehler et al. |
| 2011/0170799 A1 | 7/2011 | Carrino et al. |
| 2011/0208724 A1 | 8/2011 | Jones et al. |
| 2011/0218934 A1 | 9/2011 | Elser |
| 2011/0225198 A1 | 9/2011 | Edwards et al. |
| 2011/0238690 A1 | 9/2011 | Arrasvuori et al. |
| 2012/0066296 A1 | 3/2012 | Appleton et al. |
| 2012/0084118 A1 | 4/2012 | Bai et al. |
| 2012/0106801 A1 | 5/2012 | Jackson |
| 2012/0144335 A1 | 6/2012 | Abeln et al. |
| 2012/0158527 A1 | 6/2012 | Cannelongo et al. |
| 2012/0159363 A1 | 6/2012 | DeBacker et al. |
| 2012/0173985 A1 | 7/2012 | Peppel |
| 2012/0206469 A1 | 8/2012 | Hulubei et al. |
| 2012/0208636 A1 | 8/2012 | Feige |
| 2012/0221580 A1 | 8/2012 | Barney |
| 2012/0323888 A1 | 12/2012 | Osann, Jr. |
| 2013/0006725 A1 | 1/2013 | Simanek et al. |
| 2013/0021445 A1 | 1/2013 | Cossette-Pacheco et al. |
| 2013/0057551 A1 | 3/2013 | Ebert et al. |
| 2013/0060786 A1 | 3/2013 | Serrano et al. |
| 2013/0073377 A1 | 3/2013 | Heath |
| 2013/0076732 A1 | 3/2013 | Cervelli et al. |
| 2013/0100134 A1 | 4/2013 | Cervelli et al. |
| 2013/0101159 A1 | 4/2013 | Chao et al. |
| 2013/0132398 A1 | 5/2013 | Pfeifle |
| 2013/0150004 A1 | 6/2013 | Rosen |
| 2013/0176321 A1 | 7/2013 | Mitchell et al. |
| 2013/0179420 A1 | 7/2013 | Park et al. |
| 2013/0254900 A1 | 9/2013 | Sathish et al. |
| 2013/0263226 A1 | 10/2013 | Sudia |
| 2013/0268520 A1 | 10/2013 | Fisher et al. |
| 2013/0279757 A1 | 10/2013 | Kephart |
| 2013/0282723 A1 | 10/2013 | Petersen et al. |
| 2013/0339891 A1 | 12/2013 | Blumenberg et al. |
| 2014/0176606 A1 | 6/2014 | Narayan et al. |
| 2014/0218400 A1 | 8/2014 | O'Toole et al. |
| 2014/0282978 A1* | 9/2014 | Lerner ............... H04L 63/083 726/7 |
| 2014/0333651 A1 | 11/2014 | Cervelli et al. |
| 2014/0337772 A1 | 11/2014 | Cervelli et al. |
| 2014/0361899 A1 | 12/2014 | Layson |
| 2015/0019443 A1 | 1/2015 | Sheets |
| 2015/0029176 A1 | 1/2015 | Baxter et al. |
| 2015/0100788 A1 | 4/2015 | Chastain et al. |
| 2015/0100907 A1 | 4/2015 | Erenrich et al. |
| 2015/0106170 A1 | 4/2015 | Bonica |
| 2015/0186821 A1 | 7/2015 | Wang et al. |
| 2015/0187036 A1 | 7/2015 | Wang et al. |
| 2015/0187100 A1 | 7/2015 | Berry et al. |
| 2015/0205955 A1* | 7/2015 | Turgeman ............... H04L 63/10 726/7 |
| 2015/0237041 A1* | 8/2015 | Flamini ............... H04L 63/0823 726/10 |
| 2015/0312323 A1 | 10/2015 | Peterson |
| 2015/0338233 A1 | 11/2015 | Cervelli et al. |
| 2015/0379413 A1 | 12/2015 | Robertson et al. |
| 2016/0021117 A1 | 1/2016 | Harmon |
| 2016/0086173 A1 | 3/2016 | Leighton |
| 2016/0226908 A1* | 8/2016 | McGeehan ......... H04L 63/1491 |
| 2017/0195286 A1 | 7/2017 | Stahura |
| 2017/0289140 A1 | 10/2017 | Cai et al. |
| 2018/0041891 A1* | 2/2018 | Bleyl ............... H04N 21/44224 |
| 2018/0139238 A1* | 5/2018 | Schultz ............... H04L 63/1491 |
| 2019/0356661 A1* | 11/2019 | Hecht ................. H04L 9/0891 |

FOREIGN PATENT DOCUMENTS

| | | |
|---|---|---|
| EP | 0763201 A1 | 3/1997 |
| EP | 2575107 A2 | 4/2013 |
| EP | 2858014 A2 | 4/2015 |
| EP | 2963595 A1 | 1/2016 |
| GB | 2516155 A | 1/2015 |
| NL | 2012778 A | 11/2014 |
| NZ | 624557 A | 8/2014 |
| WO | 9532424 A1 | 11/1995 |
| WO | 0009529 A2 | 2/2000 |
| WO | 0198925 A2 | 12/2001 |
| WO | 2004057268 A2 | 7/2004 |
| WO | 2005013200 A1 | 2/2005 |
| WO | 2008064207 A2 | 5/2008 |
| WO | 2009061501 A1 | 5/2009 |
| WO | 2009123975 A1 | 10/2009 |
| WO | 2011058507 A1 | 5/2011 |

OTHER PUBLICATIONS

NPL Search Terms (Year: 2023).*
"A First Look: Predicting Market Demand for Food Retail using a Huff Analysis," TRF Policy Solutions, Jul. 2012, pp. 30.
"Andy Turner's GISRUK 2012 Notes" <https://docs.google.com/document/d/1cTmxg7mVx5gd89lqblCYvCEnHA4QAivH8-14WpyPsqE4/edit?pli=1> printed Sep. 16, 2013 in 15 pages.
"HunchLab: Heat Map and Kernel Density Calculation for Crime Analysis," Azavea Journal, printed from www.azavea.com/blogs/newsletter/v4i4/kernel-density-capabilities-added-to- -hunchlab/ on Sep. 9, 2014, 2 pages.
Barnes et al., "Viewshed Analysis", GIS-ARC/INFO 2001, <www.evsc.virginia.edu/.about.jhp7e/evsc466/student_pres/Rounds.pdf>,.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Definition "Identify", downloaded Jan. 22, 2015, 1 page.
Definition "Overlay", downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-th- e-huff-model/123411.

(56) References Cited

OTHER PUBLICATIONS

Extended European Search Report for EP Application No. 19203382.7 dated Dec. 19, 2019, 8 pages.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Gorr et al., "Crime Hot Spot Forecasting: Modeling and Comparative Evaluation", Grant 98-IJ-CX-K005, May 6, 2002, 37 pages.
Giiffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Ipbucker, C., "Inverse Transformation for Several Pseudocylindrical Map Projections Using Jacobian Matrix," ICCSA 2009, Part 1 LNCS 5592, pp. 553-564.
Issue Notification for U.S. Appl. No. 13/917,571 dated Aug. 5, 2014.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," <http://www-users.cs.umn.edu/.about.npramod/enc_pdf.pdf> retrieved Jan. 28, 2010, pp. 7.
Map Builder, "Rapid Mashup Development Tool for Google and Yahoo Maps!" <http://web.archive.org/web/20090626224734/http://www.mapbuilder.net/&- gt; printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Murray, C., Oracle Spatial Developer's Guide-6 Coordinate Systems (Spatial Reference Systems), <http://docs.oracle.com/cd/B28359_01/appdev.111/b28400.pdf>, Jun. 2009.
Notice of Acceptance for Australian Patent Application No. 2012216622 dated Jan. 6, 2015.
Notice of Allowance for U.S. Appl. No. 12/840,673 dated Apr. 6, 2015.
Notice of Allowance for U.S. Appl. No. 13/728,879 dated Jun. 21, 2016.
Notice of Allowance for U.S. Appl. No. 13/948,859 dated Dec. 10, 2014.
Notice of Allowance for U.S. Appl. No. 14/294,098 dated Dec. 29, 2014.
Notice of Allowance for U.S. Appl. No. 14/319,161 dated May 4, 2015.
Notice of Allowance for U.S. Appl. No. 14/730,123 dated Apr. 12, 2016.
NPL Search Terms (Year: 2020).
NPL Search Terms (Year: 2021).
Official Communication for Australian Patent Application No. 2014202442 dated Mar. 19, 2015.
Official Communication for Australian Patent Application No. 2014213553 dated May 7, 2015.
Official Communication for European Patent Application No. 14187739.9 dated Jul. 6, 2015.
Official Communication for Great Britain Patent Application No. 1408025.3 dated Nov. 6, 2014.
Official Communication for Netherlands Patent Application No. 2011632 dated Feb. 8, 2016.
Official Communication for Netherlands Patent Application No. 2012778 dated Sep. 22, 2015.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/840,673 dated Jan. 2, 2015.
Official Communication for U.S. Appl. No. 12/840,673 dated Sep. 17, 2014.
Official Communication for U.S. Appl. No. 13/728,879 dated Aug. 12, 2015.
Official Communication for U.S. Appl. No. 13/728,879 dated Jan. 27, 2015.
Official Communication for U.S. Appl. No. 13/728,879 dated Mar. 17, 2015.
Official Communication for U.S. Appl. No. 13/728,879 dated Nov. 20, 2015.
Official Communication for U.S. Appl. No. 14/289,596 dated Apr. 30, 2015.
Official Communication for U.S. Appl. No. 14/289,596 dated Jan. 26, 2015.
Official Communication for U.S. Appl. No. 14/289,596 dated Jul. 18, 2014.
Official Communication for U.S. Appl. No. 14/289,596 dated May 9, 2016.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/319,161 dated Jan. 23, 2015.
Official Communication for U.S. Appl. No. 14/490,612 dated Aug. 18, 2015.
Official Communication for U.S. Appl. No. 14/730,123 dated Sep. 21, 2015.
Official Communication for U.S. Appl. No. 14/929,584 dated Feb. 4, 2016.
Official Communication for U.S. Appl. No. 14/929,584 dated May 25, 2016.
Official Communication for U.S. Appl. No. 14/934,004 dated Feb. 16, 2016.
Open Street Map, "Amm's Diary:Unconnected ways and other data quality issues," http://www.openstreetmap.org/user/amm/diary printed Jul. 23, 2012 in 3 pages.
POI Editor, "How to: Create Your Own Points of Interest," <http://www.poieditor.com/articles/how_to create_your_own_points_of_ interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Te- aching/EES6513/08-3D.pdf> printed Sep. 16, 2013 in 26 pages.
Reddy et al., "Under the hood of GeoVRML 1.0," SRI International, Proceedings of the fifth symposium on Vurtual Reality Modeling

(56) References Cited

OTHER PUBLICATIONS

Language (Web3D-VRML), New York, NY, Feb. 2000, pp. 23-28. <http://pdf.aminer.org/000/648/038/under_the_hood_of_geovrml.pdf>.

Reibel et al., "Areal Interpolation of Population Counts Using Pre-classi_ed Land Cover Data," Population Research and Policy Review, 2007, vol. 26, pp. 619-633.

Reibel, M., "Geographic Information Systems and Spatial Data Processing in Demography: a Review," Population Research and Policy Review, 2007, vol. 26, pp. 601-618.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.

Singaravelu, Lenin, Jinpeng Wei, and Calton Pu. A Secure Middleware Architecture for Web Services. Georgia Institute of Technology, 2007. (Year: 2007).

Snyder, "Map Projections—A Working Manual," U.S. Geological Survey Professional paper 1395, United States Government Printing Office, Washington: 1987, pp. 11-21 and 60-70.

Sonris, "Using the Area of Interest Tools," <http://web.archive.org/web/20061001053327/http://sonris-www.dnr.state-.la.us/gis/instruct_files/tutslide12> printed Jan. 3, 2013 in 1 page.

Tangelder et al., "Freeform Shape Matching Using Minkowski Operations," The Netherlands, Jun. 1996, pp. 12.

Thompson, Mick, "Getting Started with GEO," Getting Started with GEO, Jul. 26, 2011.

Valentini et al., "Ensembles of Learning Machines", M. Marinara and R. Tagliaferri (Eds.): WIRN VIETRI 2002, LNCS 2486, pp. 3-20.

VB Forums, "Buffer a Polygon," Internet Citation, <http://www.vbforums.com/showthread.php7198436-Buffer-a-Polygon>, Specifically Thread #1, #5 & #11 retrieved on May 2, 2013, pp. 8.

Vivid Solutions, "JTS Topology Suite: Technical Specifications," <http://www.vividsolutions.com/jts/bin/JTS%20Technical%20Specs.pdf> Version 1.4, 2003, pp. 36.

Wikipedia, "Douglas_Peucker-Algorithms," <http://de.wikipedia.org/w/index.php?title=Douglas-Peucker-Algorithmus-&oldid=91846042> printed Jul. 2011, pp. 2.

Wikipedia, "Ramer_Douglas_Peucker Algorithm," <http://en.wikipedia.org/wiki/Ramer%E2%80%93Douglas%E2%80%93Peucker_al-gorithm> printed Jul. 2011, pp. 3.

Wongsuphasawat et al., "Visual Analytics for Transportation Incident Data Sets," Transportation Research Record 2138, 2009, pp. 135-145.

Woodbridge, Stephen, "[geos-deyel] Polygon simplification," <http://lists.osgeo.org/pipermail/geos-deyel/2011-May/005210.html> dated May 8, 2011, pp. 3.

Communication pursuant to Article 94(3) for EP Application No. 19203382.7 dated May 21, 2021, 7 pages.

\* cited by examiner

400

```
┌─────────────────────────────────────────────────────────────┐
│ Determine an access request provided by an entity that seeks to interact │
│ with one or more backend systems through a middleware system, the │
│         access request including a genuine access token        │
│                            402                                 │
└─────────────────────────────────────────────────────────────┘
                              │
                              ▼
┌─────────────────────────────────────────────────────────────┐
│      Authenticate the entity based on the genuine access token │
│                            404                                 │
└─────────────────────────────────────────────────────────────┘
                              │
                              ▼
┌─────────────────────────────────────────────────────────────┐
│   Provide the access request to the middleware service, wherein the │
│ access request is modified to replace the genuine access token with an │
│                      invalid access token                      │
│                            406                                 │
└─────────────────────────────────────────────────────────────┘
```

FIGURE 4

APPROACHES FOR SECURING MIDDLEWARE DATA ACCESS

CROSS REFERENCE TO RELATED APPLICATIONS

This application is a continuation of U.S. application Ser. No. 16/171,075, filed Oct. 25, 2018, now U.S. Pat. No. 11,025,672, the content of which is incorporated by reference in its entirety into the present disclosure.

FIELD OF THE INVENTION

This disclosure relates to approaches for managing access to resources.

BACKGROUND

Conventional middleware solutions, e.g., serverless platforms ("lambdas", "functions as a service", etc.), can provide interfaces that allow applications to interact with various backend systems. These conventional middleware solutions, however, have several disadvantages. For instance, conventional middleware solutions are typically unable to prevent malicious harvesting of tokens that are used to access backend systems. Conventional middleware solutions are also typically unable to regulate or proscribe operations performed by applications interacting with backend systems.

SUMMARY

Various embodiments of the present disclosure can include systems, methods, and non-transitory computer readable media configured to determine an access request provided by an entity that seeks to interact with one or more backend systems through a middleware system, the access request including a genuine access token. The entity can be authenticated based on the genuine access token. The access request can be directed to a smart reverse proxy before it is forwarded to the middleware system, where the access request is modified to replace the genuine access token with a technically invalid access, "placeholder" token.

In an embodiment, the systems, methods, and non-transitory computer readable media are configured to determine that the middleware system has made an access request to the one or more backend systems using the invalid access token in response to the access request provided by the entity and intercept the access request to the one or more backend systems, wherein the intercepted access request is modified to replace the invalid access token with the genuine access token.

In an embodiment, the genuine access token is not made accessible to the middleware system.

In an embodiment, the entity is a user, a software application, or a computing device.

In an embodiment, the invalid access token has no rights to access data from the one or more backend systems.

In an embodiment, the systems, methods, and non-transitory computer readable media are configured to receive a request from the one or more backend systems to replace the invalid access token with the genuine access token and provide the genuine access token to the one or more backend systems, wherein the genuine access token is used to authenticate an access request made by the middleware system to the one or more backend systems.

In an embodiment, the systems, methods, and non-transitory computer readable media are configured to determine that the one or more backend systems from which the request was received are included in a whitelist of entities that are permitted to receive genuine access tokens.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4 illustrates a flowchart of an example method, in accordance with various embodiments.

DETAILED DESCRIPTION

Figure 1:
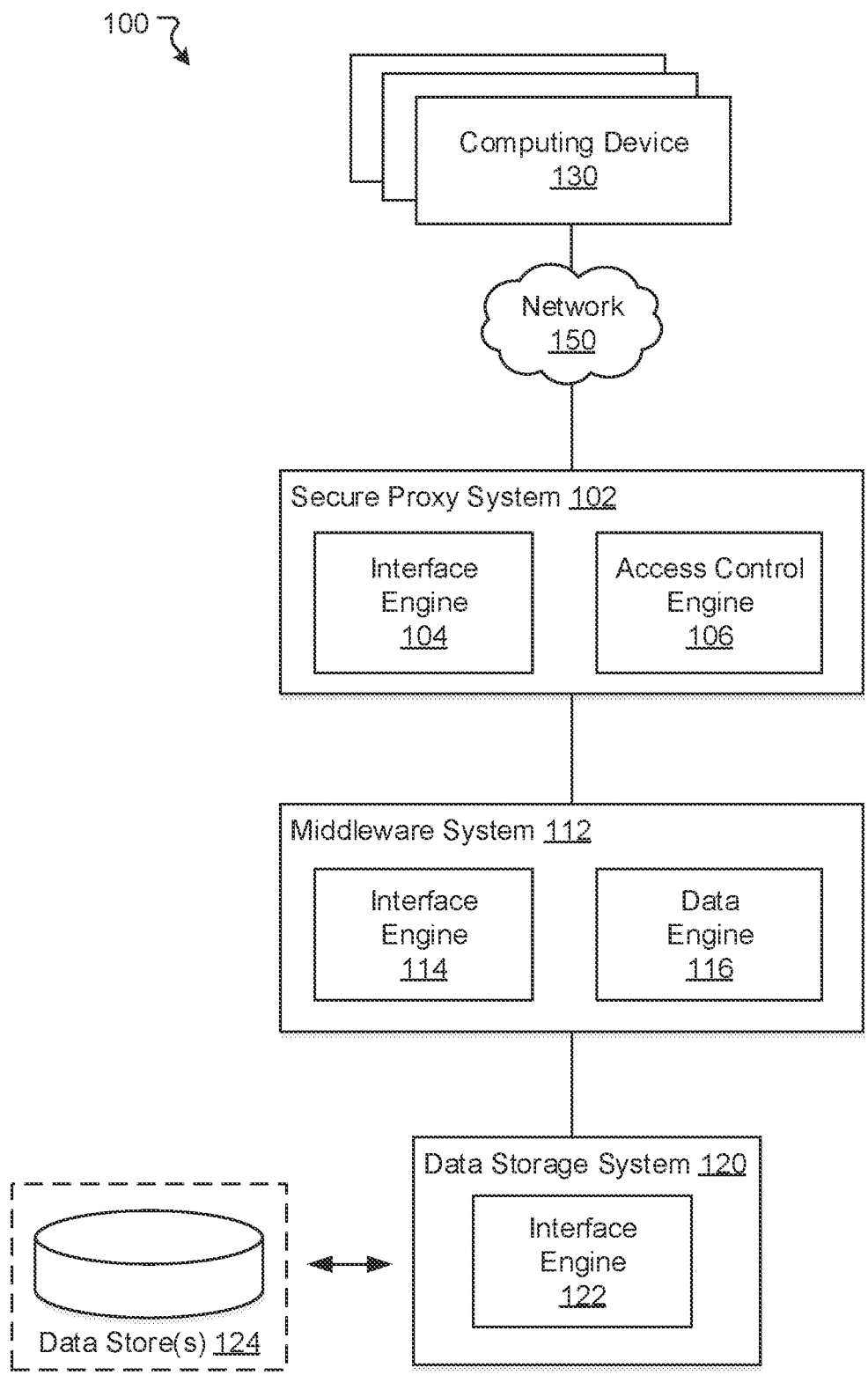
FIG. 1 illustrates an example computing environment, in accordance with various embodiments.

Conventional middleware solutions, e.g., serverless platforms (lambda, functions-as-a-service, etc.), can provide interfaces that allow applications to interact with various backend systems. These conventional middleware solutions, however, have several disadvantages. For instance, conventional middleware solutions are typically unable to prevent malicious harvesting of tokens that are used to access backend systems. Conventional middleware solutions are also typically unable to regulate or prescribe operations performed by applications interacting with backend systems.

A claimed solution rooted in computer technology overcomes problems specifically arising in the realm of computer technology. In various embodiments, a middleware system can be configured to manage application access to one or more backend systems (e.g., backend storage systems). For example, the middleware system may permit applications to access data stored by the backend systems through various endpoints (e.g., application programming interfaces). For example, the middleware system may be implemented by a first entity, an application relying on the middleware system to access a backend system may be developed by a second entity, and the backend system may be managed by a third entity. In some embodiments, the endpoints provided by the middleware system may be associated with software code that is executed in response to calls made by an application. For example, an application may submit a call through an endpoint to request data corresponding to a particular product. In this example, in response to the application call, the endpoint may execute code that makes many different application programming interface (API) calls and ultimately returns packaged data to the application.

In various embodiments, the middleware system can be secured using a smart proxy system (e.g., secure proxy system) that manages all interactions with the middleware system, e.g., network ingress and network egress. When invoking a middleware endpoint, the client application might provide an access token to authenticate the application (or a user of the application) with the middleware endpoint or downstream data sources. In some embodiments, the secure proxy system acts as an ingress proxy and intercepts the original client request to the middleware system. It authenticates the application based on the access token but does not provide a true access token to the middleware system. Rather, the secure proxy system replaces the access token with an invalid "placeholder" access token that is meaningless outside the context of the smart proxy before forwarding the client request to the middleware system. As a result, the middleware system is only aware of the invalid access token which is useless if harvested. Because regular functionality might require the middleware system to authenticate with downstream systems, the middleware system can proceed to make network requests through the secure proxy (as an egress proxy) to the downstream systems using the "placeholder" token, and the secure proxy system can replace the invalid access token with the genuine access token. In some embodiments, the secure proxy system can be associated with a whitelist which identifies applications from which the secure proxy system is permitted to receive genuine access tokens. The whitelist can also identify systems to which the secure proxy system is permitted to provide genuine access tokens.

FIG. 1 illustrates an example environment 100, in accordance with various embodiments. The example environment 100 can include at least a secure proxy system 102 (e.g., a smart proxy system, smart ingress proxy, smart egress proxy), a middleware system 112, a data storage system 120, and at least one computing device 130. The secure proxy system 102, the middleware system 112, the data storage system 120, and the computing device 130 can each include one or more processors and memory. The processors can be configured to perform various operations by interpreting machine-readable instructions. The data storage system 120 can access one or more data stores 124. In general, a data store may be any device in which data can be stored and from which data can be retrieved. In some embodiments, the data storage system 120 may store and manage various data as objects in one or more object graphs. In some embodiments, an object graph may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. In some embodiments, data corresponding to populated object graphs is stored in data stores 124 and accessible through the data storage system 120. The data storage system 120 may be accessible to the secure proxy system 102 and the middleware system 112 either directly or over a network 150. The network 150 may be any wired or wireless network through which data can be sent and received (e.g., the Internet, local area network, etc.).

Under conventional approaches, the middleware system 112 can be configured to process requests received from the computing device 130 or from software applications running on the computing device 130. In various embodiments, the middleware system 112 can include an interface engine 114 and a data engine 116. The interface engine 114 and the data engine 116 can be executed by the processor(s) of the middleware system 112 to perform various operations. In general, the interface engine 114 and the data engine 116 can be implemented, in whole or in part, as software that is capable of running on one or more computing devices or systems. In one example, the interface engine 114 and the data engine 116 may be implemented as or within a software application running on one or more computing devices (e.g., user or client devices) and/or one or more servers (e.g., cloud servers). In some instances, various aspects of the interface engine 114 and the data engine 116 may be implemented in one or more computing systems and/or devices. Under conventional approaches, the computing device 130 can send a request to access data to the middleware system 112. For example, a software application (e.g., an "app") running on the computing device 130 may rely on data stored in the data stores 124. The request can include an access token that authorizes the computing device 130 to access the data storage system 120. The interface engine 114 implemented by the middleware system 112 can provide an endpoint (e.g., application programming interface) through which such requests can be received. Upon receiving the request, the interface engine 114 can authenticate the computing device 130 based on the access token included with the request. Once authenticated, the data engine 116 can interact with the data storage system 120 to obtain the requested data. For example, the data engine 116 can interact with an endpoint (e.g., application programming interface) provided by an interface engine 122 of the data storage system 120. In some embodiments, the interface 122 can also authenticate the computing device 130 based on the access token included with the request. Upon authentication, the data storage system 120 can obtain the requested data from the data stores 124 and can provide the data to the middleware system 112. In some embodiments, the data engine 116 may perform various operations on the obtained data. For example, the data engine 116 may combine data that was obtained based on multiple requests for data made to the interface engine 122. The data engine 116 can then provide the data to the computing device 130, for example, over the network 150.

There may be instances where it is desirable to prevent exposure of the access token to the middleware system 112. For example, the middleware system 112 may be accessible to entities that may harvest access tokens for malicious purposes such as a vector to escalate permissions on downstream data sources. Thus, in various embodiments, the secure proxy system 102 can be configured to manage access to the data storage system 120 and data stores 124 as an ingress proxy. In various embodiments, the secure proxy system 102 can include an interface engine 104 and an access control engine 106. The interface engine 104 and the access control engine 106 can be executed by the processor(s) of the secure proxy system 102 to perform various operations. In general, the interface engine 104 and the access control engine 106 can be implemented, in whole or in part, as software that is capable of running on one or more computing devices or systems. In one example, the interface engine 104 and the access control engine 106 may be implemented as or within a software application running on one or more computing devices (e.g., user or client devices) and/or one or more servers (e.g., cloud servers). In some instances, various aspects of the interface engine 104 and the access control engine 106 may be implemented in one or more computing systems and/or devices. Under an improved approach rooted in computer technology, the computing device 130 can send a request to access data to the secure proxy system 102. For example, a software application (e.g., an "app") running on the computing device 130 may rely on data stored in the data stores 124. The request can include a genuine access token that authorizes the computing device 130 to access the data storage system 120. The interface engine 104 implemented by the secure proxy system 102 can proxy an endpoint (e.g., application programming interface) through which such requests can be received. Upon receiving the request, the interface engine 104 can authenticate the computing device 130 based on the genuine access token included with the request. Once authenticated, the access control engine 106 can inform the middleware system 112 that the computing device 130 has been authenticated. In some embodiments, the access control engine 106 can replace the genuine access token included in the request with an invalid access token that provides no access rights outside of the context of the secure proxy. In such embodiments, the access control engine 106 can provide the request and the invalid access token to the middleware system 112, for example, through the interface engine 114. At this point, the middleware system 112 is only aware of the request sent by the computing device 130 and the invalid access token. As a result, any harvesting of the invalid access token by the middleware system 112 is inconsequential since this token provides no access rights. Next, the data engine 116 of the middleware system 112 can interact with the data storage system 120 to obtain the data requested by the computing device 130. For example, the data engine 116 can interact with the endpoint (e.g., application programming interface) provided by the interface engine 122 of the data storage system 120. In this example, the data engine 116 sends a request to obtain the requested data through the endpoint provided by the interface engine 122. The request can include the invalid access token that is held by the middleware system 112. In some embodiments, the access control engine 106 of the secure proxy system 102 can intercept the request to replace the invalid access token held by the middleware system 112 with the genuine access token needed to access the data storage system 120. The interface engine 122 of the data storage system 120 can authenticate the request based on the genuine access token. Upon authentication, the data storage system 120 can obtain the requested data from the data stores 124 and can provide the data to the middleware system 112. In some embodiments, rather replacing the invalid access token with the genuine access token, the access control engine 106 can provide an endpoint (e.g., application programming interface) that can be used to swap invalid access tokens with corresponding genuine access tokens. For example, the data engine 116 can interact with the endpoint (e.g., application programming interface) provided by the interface engine 122 of the data storage system 120 to obtain requested data. In this example, the data engine 116 sends a request to obtain the requested data through the endpoint provided by the interface engine 122 along with the invalid access token that is held by the middleware system 112. The data storage system 120 can receive the request and the invalid access token. The data storage system 120 can then interact with the access control engine 106 to determine the genuine access token that was provided by the computing device 130 but not exposed to the middleware system 112. Once obtained, the genuine access token can be used by the data storage system 120 to authenticate the request for data. The data storage system 120 can then provide the requested data to the middleware system 112 upon processing the authenticated request. In some embodiments, the access control engine 106 can maintain a whitelist of computing devices (or software applications) from which the secure proxy system 102 is permitted to receive genuine access tokens. Similarly, the access control engine 106 can maintain a whitelist of computing systems to which the secure proxy system 102 is permitted to provide genuine access tokens. More details describing the access control engine 106 are provided below in reference to FIG. 2.

Figure 2:
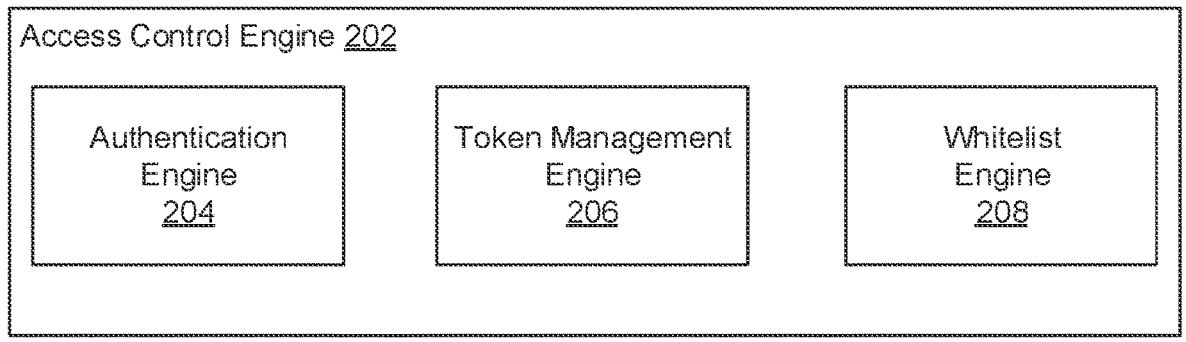
FIG. 2 illustrates an example access control engine, in accordance with various embodiments.

FIG. 2 illustrates an example access control engine 202, in accordance with various embodiments. The access control engine 202 may be implemented as the access control engine 106 of FIG. 1. In some embodiments, the access control engine 202 includes an authentication engine 204, a token management engine 206, and a whitelist engine 208.

The authentication engine 204 can be configured to authenticate entities (e.g., users, applications, computing devices). In various embodiments, the authentication engine 204 can provide an endpoint through which entities can submit access tokens for purposes of authentication. The authentication engine 204 can, therefore, determine whether a given access token is valid and any data access restrictions that are associated with the access token.

The token management engine 206 can be configured to manage access tokens provided by entities. In various embodiments, the token management engine 206 can replace genuine access tokens provided by entities with corresponding invalid access tokens. The token management engine 206 can, therefore, maintain associations between genuine access tokens and their corresponding invalid access tokens. As mentioned, the token management engine 206 can provide invalid access tokens to middleware systems (e.g., the middleware system 112 of FIG. 1) to prevent harvesting of genuine access tokens by potentially malicious actors. In some embodiments, when a middleware system requests data from a data storage system, the middleware system can send a request for data along with an invalid access token that was previously provided to the middleware system. In this example, the token management engine 206 can intercept the request to replace the invalid access token with a corresponding genuine access token. The data storage system, therefore, receives a request for data with the genuine access token. As a result, the data storage system is able to process the request for data based on the genuine access token. In other embodiments, the token management engine 206 can provide an endpoint that can be used to swap invalid access tokens with their corresponding genuine access tokens. This endpoint may be used, for example, by computing systems (e.g., the data storage system 120 of FIG. 1) when processing requests received from a middleware system (e.g., the middleware system 112 of FIG. 1). For instance, a computing system that received a request including an invalid access token may interact with the endpoint to determine a corresponding genuine access token that is associated with the invalid access token. The computing system can then authenticate the request based on the genuine access token.

The whitelist engine 208 can be configured to maintain one or more whitelists. In some embodiments, the whitelist engine 208 can maintain a whitelist of entities (e.g., users, applications, computing devices) from which the access control engine 202 is permitted to receive genuine access tokens. For example, the whitelist engine 208 can accept access tokens provided with requests that are sent by trusted entities included in the whitelist. In such embodiments, the whitelist engine 208 can reject any access tokens that are provided by entities not included in the whitelist. Similarly, in some embodiments, the access control engine 106 can maintain a whitelist of computing systems to which the secure proxy system 102 is permitted to provide genuine access tokens. For example, the whitelist engine 208 can be configured to provide genuine access tokens to trusted computing systems included in the whitelist. Thus, in some embodiments, when a middleware system attempts to request data from a trusted computing system included in the whitelist, the access control engine 202 can intercept the request to include a corresponding genuine access token and/or can permit the trusted computing system to obtain the genuine access token through the endpoint provided by the token management engine 206.

Figure 3:
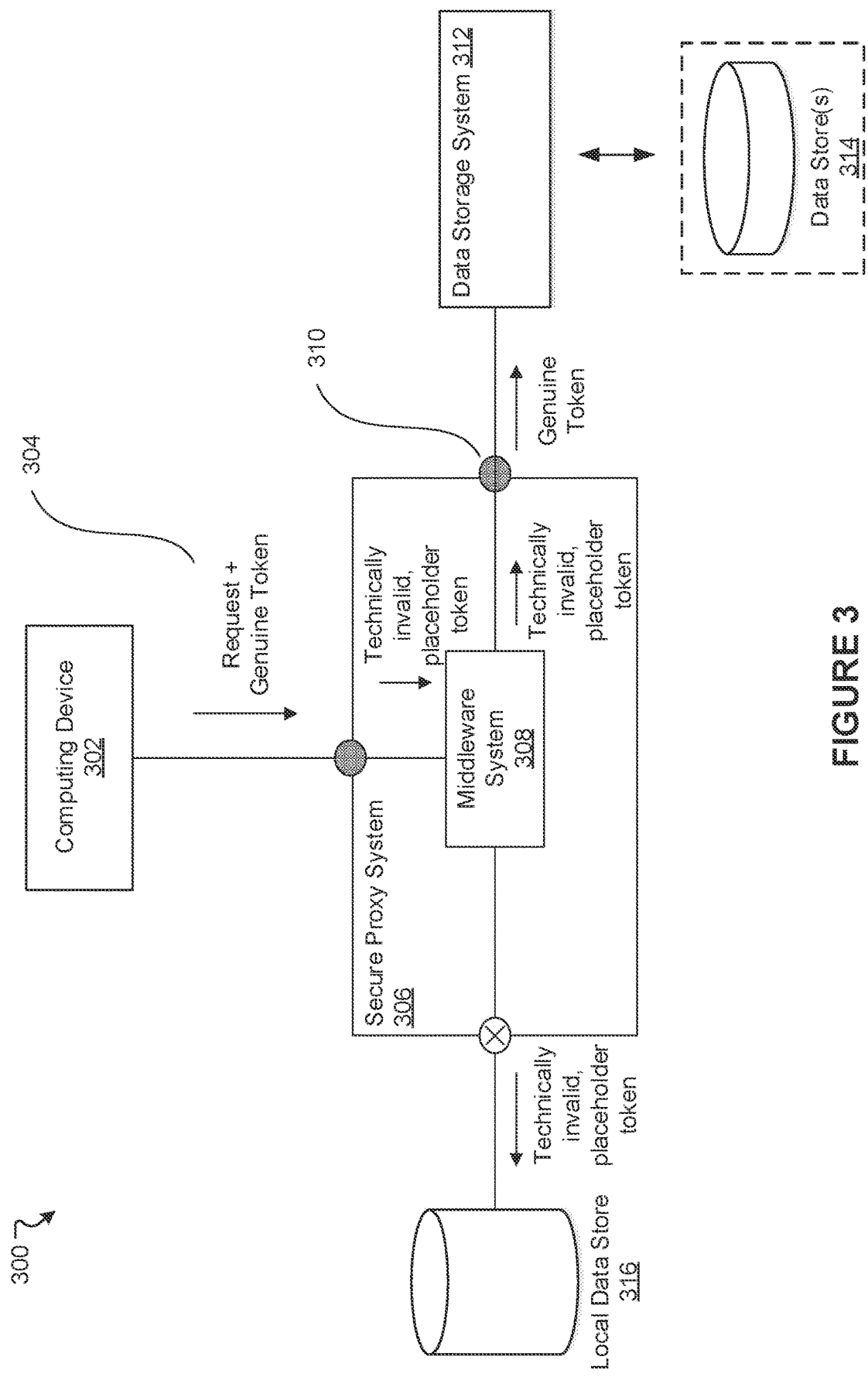
FIG. 3 illustrates an example diagram, in accordance with various embodiments.

FIG. 3 illustrates an example diagram 300, in accordance with various embodiments. In FIG. 3, a computing device 302 has sent a request for data 304 that is stored in one or more data stores 314 of a data storage system 312. In this example, the request for data includes a genuine access token that authorizes the computing device 302 to access the requested data. In various embodiments, a secure proxy system 306 can process the request 304 by replacing the genuine access token with an invalid access token. The request 304 can then be provided to a middleware system 308 along with the invalid access token. The middleware system 308 can interact with the data storage system 312 to obtain the requested data. When interacting with the data storage system 312, the middleware system 308 can attempt to authenticate the request for data by providing the invalid access token to the data storage system 312. In some embodiments, the secure proxy system 306 can intercept the request as an egress proxy including the invalid access token 310 and can replace the invalid access token with the corresponding genuine access token provided by the computing device 302. The data storage system 312 can then authenticate and process the request using the genuine access token provided by the secure proxy system 306. In other embodiments, the middleware system 308 can provide the request for data and the invalid access token to the data storage system 312. In such embodiments, the data storage system 312 can access an endpoint provided by the secure proxy system 306 to obtain the corresponding genuine access token. The data storage system 312 can then authenticate and process the request using the genuine access token provided by the secure proxy system 306. Thus, the middleware system 308 is never aware of the genuine access token that was provided by the computing device 302. As a result, any attempt by the middleware system 308 to harvest access tokens, for example, to a local data store 316 are inconsequential since the harvested access tokens are invalid.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a determination is made of an access request provided by an entity that seeks to interact with one or more backend systems through a middleware system, the access request including a genuine access token. At block 404, the entity is authenticated based on the genuine access token. At block 406, the access request can be provided to the middleware system, wherein the access request is modified to replace the genuine access token with an invalid access token.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
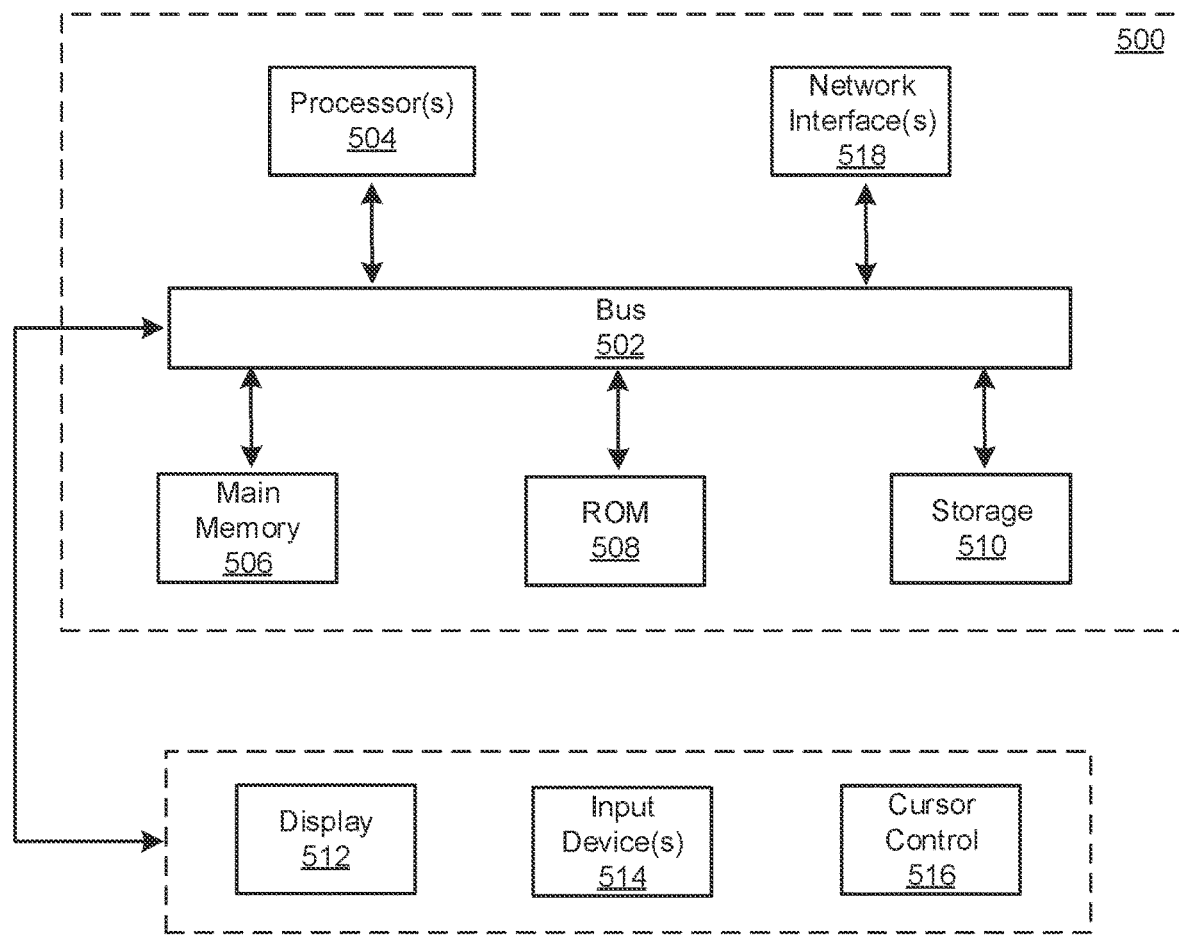
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method, comprising:
    determining, by a computing system, that an access request provided by an entity seeks to request data from one or more backend systems through a middleware system, the access request including a genuine access token;
    providing, by the computing system, the access request to the middleware system;
    detecting, by the computing system, that the middleware system is attempting to retrieve requested data corresponding to the access request at the one or more backend systems by presenting an invalid token;
    providing an application programming interface (API) endpoint that maps the invalid token to the genuine access token, wherein the API endpoint performs a process that replaces the invalid token with the invalid token at the middleware system;
    receiving, through an API call to the API endpoint, the genuine access token; and
    in response to the detection, replacing, by the computing system, the invalid access token with the genuine access token in order to retrieve the requested data.

2. The computer-implemented method of claim 1, further comprising:
    authenticating the entity based on the genuine access token; and
    indicating, to the middleware system, that the entity has been authenticated.

3. The computer-implemented method of claim 1, wherein the invalid access token, without being replaced, fails to provide access rights to the one or more backend systems.

4. The computer-implemented method of claim 1, wherein the entity is a user, a software application, or an other computing device.

5. The computer-implemented method of claim 1, wherein the entity has been authorized to receive the genuine access token.

6. The computer-implemented method of claim 1, wherein the replacing of the invalid access token is in response to a request from the one or more backend systems to replace the invalid access token with the genuine access token, and provides the genuine access token to the one or more backend systems.

7. The computer-implemented method of claim 6, wherein the one or more backend systems from which the request was received are included in a permitted list.

8. A system comprising:
    one or more processors; and
    a memory storing instructions that, when executed by the one or more processors, cause the system to perform:
        determining that an access request provided by an entity requests to retrieve data from one or more backend systems through a middleware system, the access request including a genuine access token;
        providing the access request to the middleware system;
        detecting that the middleware system is attempting to retrieve requested data corresponding to the access request at the one or more backend systems by presenting an invalid token;
        receiving, through an API call to the API endpoint, the genuine access token, wherein the API endpoint maps the invalid token to the genuine access token, wherein the API endpoint performs a process that replaces the invalid token with the invalid token at the middleware system;
    and
    in response to the detection, replacing the invalid access token with the genuine access token in order to retrieve the requested data.

9. The system of claim 8, wherein the instructions further cause the system to perform:
    authenticating the entity based on the genuine access token; and
    indicating, to the middleware system, that the entity has been authenticated.

10. The system of claim 8, wherein the invalid access token, without being replaced, fails to provide access rights to the one or more backend systems.

11. The system of claim 8, wherein the entity is a user, a software application, or an other computing device.

12. The system of claim 8, wherein the entity has been authorized to receive the genuine access token.

13. The system of claim 8, wherein the replacing of the invalid access token is in response to a request from the one or more backend systems to replace the invalid access token with the genuine access token, and provides the genuine access token to the one or more backend systems.

14. The system of claim 13, wherein the one or more backend systems from which the request was received are included in a permitted list.

15. The system of claim 8, wherein the detecting, by the computing system, that the middleware system is attempting to retrieve requested data is through the API endpoint.

16. The system of claim 8, wherein the access request comprises a first access request, the middleware system comprises a first middleware system, and the instructions that, when executed, cause one or more processors to perform:
  determining that a second access request provided by the entity or a second entity requests to retrieve second data from one or more backend systems through a second middleware system, the access request including a genuine access token;
  providing the access request to the second middleware system;
  detecting that the second middleware system is attempting to retrieve the requested second data corresponding to the access request at the one or more backend systems by presenting the genuine access token; and interfacing with a datastore to retrieve the requested second data.

17. A non-transitory computer readable medium comprising instructions that, when executed, cause one or more processors to perform:
  determining that an access request provided by an entity requests to retrieve data from one or more backend systems through a middleware system, the access request including a genuine access token;
  providing the access request to the middleware system;
  detecting that the middleware system is attempting to retrieve requested data corresponding to the access request at the one or more backend systems by presenting an invalid token;
  receiving, through an API call to the API endpoint, the genuine access token, wherein the API endpoint maps the invalid token to the genuine access token, wherein the API endpoint performs a process that replaces the invalid token with the invalid token at the middleware system; and
  in response to the detection, replacing the invalid access token with the genuine access token in order to retrieve the requested data.

18. The non-transitory computer readable medium of claim 17, wherein the instructions further cause the one or more processors to perform:
  authenticating the entity based on the genuine access token; and
  indicating, to the middleware system, that the entity has been authenticated.

19. The non-transitory computer readable medium of claim 17, wherein the invalid access token, without being replaced, fails to provide access rights to the one or more backend systems.

20. The non-transitory computer readable medium of claim 17, wherein the replacing of the invalid access token is in response to a request from the one or more backend systems to replace the invalid access token with the genuine access token, and provides the genuine access token to the one or more backend systems.

* * * * *